Oct. 22, 1963 C. F. MATTKE 3,108,159

SPACE SAVER DIAL

Filed May 9, 1960 2 Sheets-Sheet 1

INVENTOR
C. F. MATTKE
BY John C. Morris
ATTORNEY

INVENTOR
C. F. MATTKE
BY John C Morris
ATTORNEY

United States Patent Office 3,108,159

Patented Oct. 22, 1963

3,108,159

SPACE SAVER DIAL

Charles F. Mattke, Fanwood, N.J., assignor to Bell Telephone Laboratories, Incorporated, New York, N.Y., a corporation of New York Filed May 9, 1960, Ser. No. 27,753
9 Claims. (Cl. 179—90)

This invention relates to telephone call transmitters and particularly to telephone call transmitters of the dial type.

An object of this invention is to provide a telephone dial that is reduced in size yet retains the high standard of performance, the same mode of customer operation, and the appearance of larger sized dials.

A particular feature of this invention resides in a finger wheel in which the finger holes are substantially the same size as the holes found in most present day finger wheels, but the major portion of the space between the first and the last hole is eliminated, and the space between adjacent holes is reduced, thereby providing a wheel of small size.

This finger wheel, as in most dials, overlies and is rotatable relative to a number plate, and the number plate, as in many dials, is the same size as the wheel, each finger hole in the wheel being positioned over an individual indicia grouping on the number plate when the wheel is in a rest position. The reduced size of the wheel thus provides a small dial face.

Another feature of this invention resides in a finger stop that is frictionally coupled to the finger wheel and movable therewith between a first and a second position, the distance between the first and the second position being comparable to the space that exists between the first and last finger hole of most present day dials.

With the present invention, the user of the dial inserts his finger into the finger hole associated with the digit he wishes to transmit to the central office and rotates the finger wheel in a clockwise direction. The rotation of the second position, after which the stop ceases to to its second position, after which the stop ceases to move, and the wheel moves relative thereto. Rotation of the wheel is continued until the user's finger strikes the stop.

A further feature of this invention resides in the finger wheel and the finger stop having cooperating detent means for stopping the wheel when it returns to a rest position.

As in most dials, when the finger wheel is rotated from a rest position, energy is stored in a motor spring, and when the user of the dial removes his finger from the wheel, the motor spring returns the wheel to the rest position. The return rotation of the wheel moves the finger stop from its second to its first position, at which time the stop is arrested, and the wheel continues to move until a detent portion thereon engages a detent portion on the finger stop.

A still further feature of this invention resides in an operator for the off-normal contacts that is displaceably coupled to the finger wheel, the finger wheel having means fixedly coupled thereto for positively displacing the operator on the return of the wheel to the rest position.

As in most dials, the contact springs for the off-normal contacts consist of a movable spring spaced from and biased toward a fixed spring. Contrary to previous dials, though, the operator for the movable spring is displaceably coupled to the finger wheel, and means for positively displacing the operator is fixedly coupled to the wheel. When the wheel is rotated from the rest position, the displacing means moves therewith, and the displaceable operator permits the movable spring to engage the fixed spring and close the off-normal contacts. On the return of the finger wheel to the rest position, the displacing means engages and positively moves the operator, causing it to separate the movable spring from the fixed spring and thereby open the off-normal contacts.

A complete understanding of the invention and of these and other features and advantages thereof may be gained from consideration of the following detailed description taken in conjunction with the accompanying drawing wherein two embodiments of the invention are illustrated. It is to be expressly understood, however, that the drawing is for the purposes of illustration and description and is not to be construed as defining the limits of the invention.

Figures 1, 2:
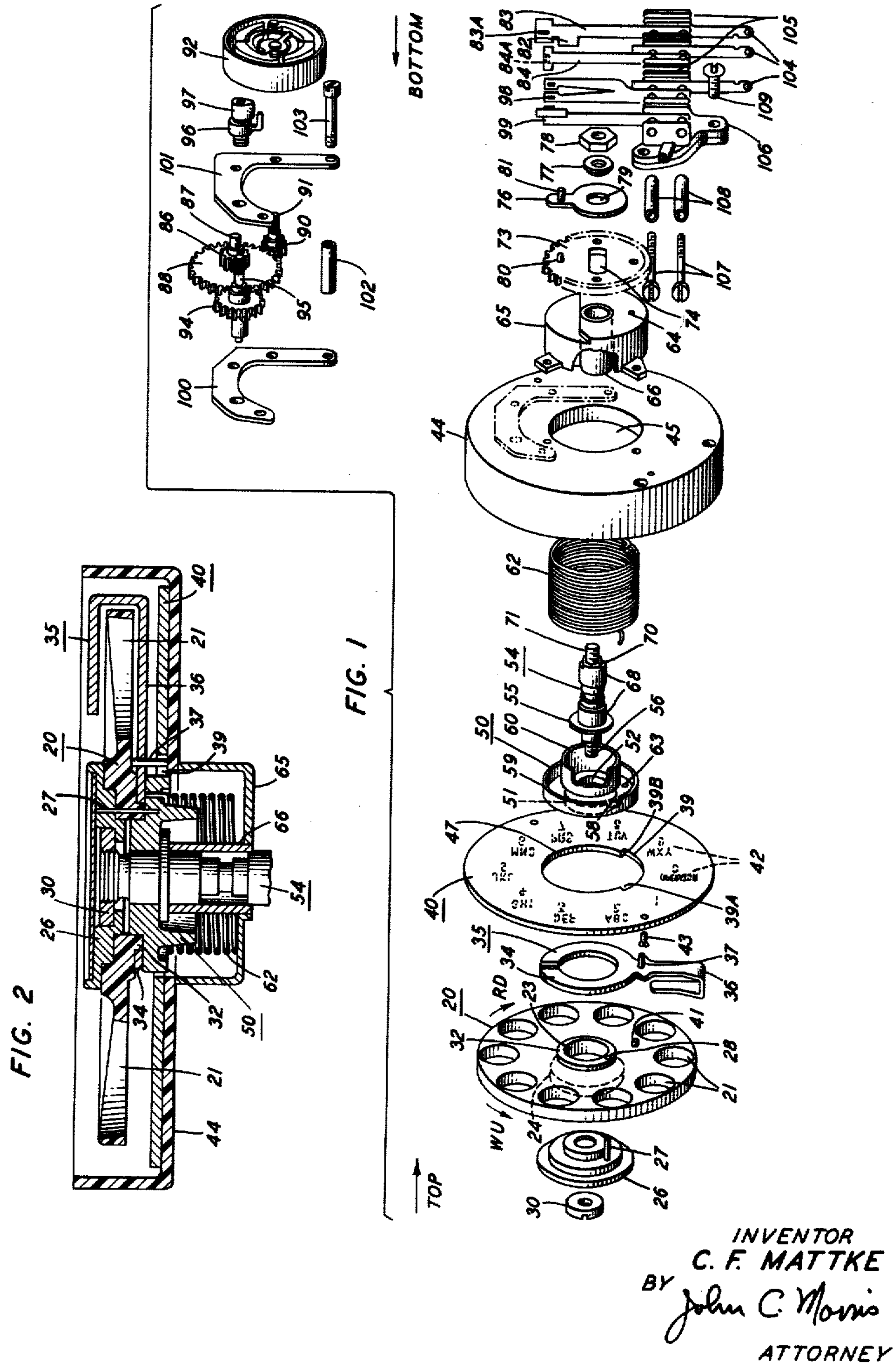
FIG. 1 is an exploded perspective view partly in section of one embodiment of this invention.
FIG. 2 is an enlarged cross sectional view of the upper portion of the first embodiment.

Referring now to FIGS. 1 and 2, one embodiment of this invention comprises a finger wheel 20 having ten finger holes 21 spaced around the periphery thereof. The finger holes are distributed so that spaces between all but two of the holes are equal and the space between these two holes, referred to as the first and last holes, is only slightly greater than the individual spaces between the other holes. Thus the large space that exists between the first and last holes of most finger wheels presently in use is virtually eliminated, and the size of the wheel is thereby reduced. In one specific embodiment, the angular pitch of all but the first and last holes is 35 degrees, 21 minutes, leaving a pitch of 41 degrees, 51 minutes between these two holes. Using finger holes of ½ inch diameter, which is the most commonly used hole size, and placing the centers of the holes on a radius of .877 inch so as to provide a web of adequate strength between the holes, a finger wheel of 2.318 inches in diameter is achieved. Using holes of 15/32 inch diameter and maintaining about the same web width between holes, a finger wheel of 2.106 inches in diameter is achieved. By way of comparison, the finger wheels most commonly used in the telephone industry have a diameter of 2.937 inches.

As shown most clearly in FIG. 2, the finger holes 21 are advantageously tapered, the holes being smaller in diameter at the bottom of the finger wheel than at the top. This provides added width to the web between the holes and thereby gives the finger wheel additional strength. Furthermore, the upper surface of the finger wheel 20 is advantageously made slightly concave by forming the rim of the wheel a small amount thicker than the portion of the wheel immediately adjacent to the hub. This tends to aid in preventing the finger of the user of the dial from slipping out of a finger hole when the wheel is rotated.

The hub of the finger wheel 20 has a central circular opening 23 around which there is a circular recess 24. The opening and recess receive a three step clamp washer 26, a first step of which is slightly smaller in diameter than the opening, a second step of which is slightly smaller in diameter than the recess, and the third step of which is greater in diameter than the recess. A dowel pin 27 is mounted in the washer and when the washer is properly positioned on the finger wheel, the dowel pin extends through an aperture 28 that is immediately adjacent to the opening 23. The upper surface of the washer is itself recessed to receive a clamp nut 30.

The bottom surface of the finger wheel 20 has a crown 32 around the central opening 23, and a split ring portion 34 of a finger stop 35 clamps around the crown, an arm portion 36 of the stop extending radially from the split ring portion and then doubling back over the top surface of the finger wheel. The split ring portion frictionally couples the stop to the wheel so that when the wheel is rotated, the stop moves therewith. However, a pin 37 mounted on the bottom surface of the stop extends into a slot 39 formed in a number plate 40 that underlies the wheel, and the motion of the stop is limited to the arcuate path between the two ends 39A and 39B of the slot. The length of this path is advantageously selected so that the stop moves through an angular distance that is twice the pitch of the finger holes. Thus in the specific embodiment previously referred to, the stop moves through an angular distance of 70 degrees, 42 minutes.

The finger stop, in turn, limits the motion of the finger wheel. When the wheel is wound up, it is rotated in the direction indicated by the arrow labeled WU until the user's finger strikes the end of the arm portion 36 that lies in the arcuate path traversed by the finger. If the rotation of the wheel is continued beyond this point, a stud 41 on the bottom surface of the wheel subsequently engages the lower end of the arm portion and prevents the wheel from being rotated further. When the finger is removed from the wheel and it is allowed to run down, it rotates in the direction indicated by the arrow labeled RD until the stud 41 strikes the other side of the lower end of the arm portion 36. The finger wheel when in this latter position is said to be in a rest position. It is to be noted that with the wheel in the rest position, the finger stop is immobilized, since its motion is limited in one direction by the end 39A of the slot 39 and in the other direction by the stud 41 on the underside of the wheel.

The number plate 40 is provided with indicia groupings 42 on the upper surface thereof, and each grouping underlies an individual finger hole 21 in the finger wheel 20 when the wheel is in a rest position. The diameter of the number plate is the same as the wheel so that a dial face of small size is achieved.

The number plate 40 is secured by fasteners such as indicated at 43 to a cup shaped frame 44 having a central opening 45 approximately the same size as a central opening 47 in the number plate. Positioned within these openings is a spring retaining cap 50. The cap has a step 51 that is slightly smaller in diameter than and is received by the central opening 23 in the finger wheel 20. The surface around the step bears against the crown 32 and acts to maintain the split ring portion 34 of the finger stop 35 in position. The cap, in turn, has a central opening 52 into which is placed the upper end of a shaft 54, a flange 55 of the shaft bearing against the underside of the cap. The shaft is threaded at 56 to receive the clamp nut 30 and the cap is apertured at 58 to receive the dowel pin 27 of the clamp washer 26. Thus when assembled, the clamp nut, clamp washer, finger wheel, cap and shaft all rotate as a single unit.

The underside of the spring retaining cap 50 is provided with coaxial tubular walls 59 and 60 between which is positioned a motor spring 62. One end of the motor spring is fixed in an aperture 63 in the cap, while the other end of the spring is fixed in an aperture 64 in a cup shaped spring retaining housing 65. The housing is fastened to the bottom of the frame 44 and has a tubular bushing portion 66 in which bearing surfaces 68 of the shaft 54 ride.

The lower end of the shaft 54 extends beyond the housing 65 and has a non-circular portion 70 and a threaded portion 71. A main gear 73 having a non-circular opening 74 is placed on the non-circular portion, and an off-normal contact operator 76, a two step clamp washer 77, and a clamp nut 78 are positioned on the threaded portion. A first step of the clamp washer is slightly thinner than the operator and slightly smaller in diameter than a central opening 79 in the operator, while the second step is larger in diameter than this opening. Thus, the clamp washer and nut fixedly couple the main gear to the non-circular portion of the shaft and frictionally couple the operator to the main gear.

Respectively mounted in the main gear 73 and the off-normal contact operator 76 are a pin 80 and a stud 81. The stud is of a height to engage a laterally extending finger portion 82 of a movable contact spring 83, carrying an off-normal contact 83A, the spring being biased to engage a fixed contact spring 84 carrying an off-normal contact 84A. The pin 80, on the other hand, is of a height to engage the operator but not to engage the finger portion 82.

The main gear 73 meshes with a gear 86 mounted on a shaft 87 having a gear 88 also mounted thereon, and the gear 88 mates with a gear 90 mounted on a shaft 91, the gear being coupled to the shaft by a band clutch not shown in the drawing. The shaft drives a governor 92 of the type disclosed in Patent 2,685,946 issued jointly to W. Pferd and R. E. Prescott on August 10, 1954. The gear 88 also meshes with a gear 94 mounted on a shaft 95 that drives an arm 96 and pulsing cam 97 of the type disclosed in Patent 2,563,581, issued jointly to H. R. Clarke, L. A. Elmer, A. Herckmans, and O. L. Walter on August 7, 1951, the arm and pulsing cam operating contact springs 98 and 99 respectively carrying pulsing contacts thereon.

The upper ends of the shafts 87, 91, and 95 are journaled in a bearing plate 100 that is fastened to the underside of the frame 44, while the lower ends of the shaft are journaled in a bearing plate 101 that is secured a predetermined distance from the bearing plate 100 by tubular spacers, one of which is shown at 102, through which fasteners such as that shown at 103 extend.

The off-normal contact springs 83 and 84, and the pulsing contact springs 98 and 99 have binding posts 104 positioned adjacent thereto and are interleaved with spacers 105 and a support member 106. Fasteners 107 around which dielectric sleeves 108 are positioned secure the contact springs, binding posts, spacers, and support member together, and the support member itself is mounted to the underside of the frame 44 by fasteners such as indicated at 109.

In the operation of the dial, the user inserts his finger into the finger hole 21 corresponding to the particular digit he wishes to transmit and moves his finger through an arcuate path so as to rotate the finger wheel 20 in the direction indicated by the arrow WU. Because the finger wheel is secured to the shaft 54 and the spring retaining cap 50, and the shaft and cap are, in turn, respectively secured to the main gear 73 and one end of the motor spring 62, the movement of the finger wheel rotates the main gear and winds up the motor spring.

The finger stop is frictionally coupled to the finger wheel and therefore moves with the finger wheel until the pin 37 engages the end 39B of the slot 39 in the number plate 40. The finger stop is then prevented from moving further, and the finger wheel moves relative thereto. The user of the dial continues to rotate the finger wheel until his finger strikes the finger stop.

The off-normal contact operator 76 is frictionally coupled to the main gear 73, and it therefore moves with the main gear. The initial movement of the main gear and operator moves the stud 81 from the finger portion 82 of the movable contact spring 83 and thereby permits the movable spring to engage the fixed contact spring 84 and close the off-normal contacts 83A and 84A. Further movement of the main gear and operator through approximately 360 degrees, as when the digit 9 or 0 is dialed, brings the stud 81 into engagement with the other side of the finger portion 82, at which time the motion of the operator is arrested. Since the pin 80 mounted in the main gear does not engage the finger portion, the main gear may continue to rotate through greater than 360 degrees without interfering with the off-normal contact springs.

Rather than being frictionally coupled to the main gear 73, the operator 76 may be made to pivot freely on the clamp washer 77 and thus be loosely coupled to the shaft 54. In this case the rotation of the main gear moves the pin 80 mounted thereon away from the operator. The operator by itself offers no resistance to the biasing force of the movable contact spring 83, and the spring engages the fixed contact spring 84 closing the off-normal contacts 83A and 84A.

When the user of the dial removes his finger from the finger hole, the motor spring 62 commences to return the finger wheel to its rest position, rotating it in the direction indicated by the arrow RD. The finger stop moves with the finger wheel until the pin 37 strikes the end 39A of the slot 39 in the number plate 40, while the finger wheel itself continues to rotate until the stud 41 thereon strikes the arm portion 36 of the arrested finger stop.

The operator 76 moves with the main gear 73 until the stud 81 strikes the finger portion 82 of the movable contact spring 83. The friction between the operator and the main gear is selected so as to be insufficient by itself to overcome the spring force of the movable contact spring 83 and separate it from the fixed contact spring 84, and only when the pin 80 mounted on the main gear engages the operator and positively moves it, are the off-normal contacts 83A and 84A opened. The pin 80 is mounted so as to engage the operator just immediately before the finger wheel reaches its rest position.

In both windup and rundown of the finger wheel 20, the main gear 73 operating through gears 86 and 88 drives the governor 92, the arm piece 96, and the pulsing cam 97. The governor operates to limit the rundown speed of the dail mechanism in the manner described in the previously cited Pferd et al. patent, while the arm piece and pulsing cam operate the pulsing contact springs 98 and 99 in the manner described in the previously cited Clarke et al. patent.

Figure 3:
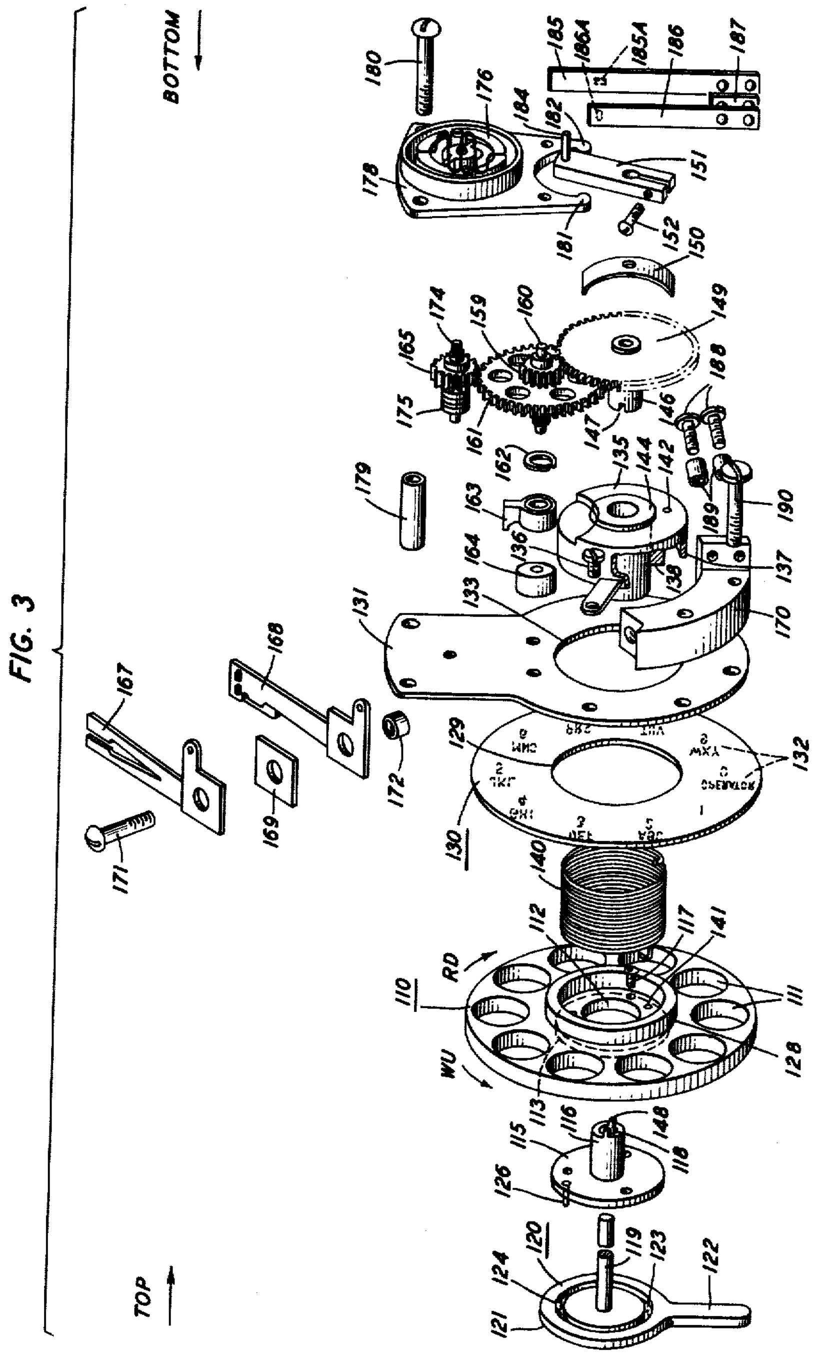
FIG. 3 is an exploded perspective view partly in section of a second embodiment of the invention.

Referring now to FIG. 3, the second embodiment of this invention comprises a finger wheel 110 having ten finger holes 111 distributed around its periphery in the same manner as in the first embodiment. The finger wheel has a central opening 112, and around the opening on the upper surface of the finger wheel there is a recess 113 that receives a finger wheel cap 115, a shaft portion 116 of the cap extending through the central opening. The cap is secured to the finger wheel by fasteners such as indicated at 117 and has a central aperture 118 through which a stem portion 119 of a finger stop 120 extends. A disk portion 121 of the finger stop overlies the cap, and an arm portion 122 extends radially from the disk portion. The bottom surface of the disk portion has a circular groove 123 in which is mounted a stop 124, and a pin 126 attached to the top surface of the cap rides in the groove.

The underside of the finger wheel 110 has a crown portion 128 that is spaced from the edge of the central opening 112 and projects into a central opening 129 in a number plate 130 underlying the finger wheel. The number plate is fastened to the upper surface of a frame 131 and is provided with indicia groupings 132 that are positioned beneath individual holes 111 in the finger wheel when the wheel is in a rest position.

The frame 131 has a central opening 133 of approximately the same size as the central opening 129 in the number plate 130, and a spring retaining housing 135, which is secured to the bottom surface of the frame by fasteners such as indicated at 136, has coaxial tubular walls 137 and 138 that extend into the opening. Positioned between the walls is a motor spring 140, one end of which is fixed in an aperture 141 in the finger wheel 110 and the other end of which is fixed in an aperture 142 in the housing, and positioned within the wall 138 is a tubular bushing 144 in which the shaft portion 116 of the finger wheel cap 115 is journaled. A tubular shaft 146 is also journaled in the bushing, and it has a pair of slots 147 that receive a pair of teeth 148 on the shaft portion 116. The two shafts are thus keyed together, and a main gear 149 mounted on the shaft 146 is thereby fixedly coupled to the finger wheel 110.

The stem portion 119 of the finger stop 120 extends through both the shafts 116 and 146 and protrudes beyond the lower end of the latter. Mounted to the protruding end of the stem is a bowed leaf spring 150 and an off-normal contact operator 151, the latter being secured to the stem by a fastener 152. The operator deflects the leaf spring so that the ends of the spring bear against the bottom surface of the main gear 149 and the center of the spring bears against the top surface of the operator. The deflected leaf spring frictionally couples the operator to the main gear, and because the main gear is fixedly coupled to the finger wheel and the operator is fixedly coupled to the finger stop, the spring also frictionally couples the finger stop to the finger wheel.

The main gear 149 meshes with a gear 159 mounted on a shaft 160 that also has a gear 161, a washer 162, an arm 163, and a pulsing cam 164 mounted thereon. The gear 161 meshes with a gear 165 while the arm and pulsing cam engage contact springs 167 and 168 respectively carrying pulsing contacts thereon. The contact springs are interleaved wth a dielectric spacer 169 and fastened to a mounting block 170 by means of a screw 171 around which is placed a dielectric sleeve 172. The gear 165 is mounted on and coupled to a shaft 174 by means of a band clutch 175, and the shaft drives a governor 176.

The governor 176 is mounted in a bearing plate 178 that receives the lower ends of the shafts 160 and 174, the upper ends of the shafts being journaled in the frame 131. The plate is spaced from the frame by tubular sleeves such as that shown at 179 through which fasteners such as 180 extend. The plate has arms 181 and 182 between which the off-normal contact operator 151 travels, and the arms are advantageously spaced so that the travel of the operator, which is also the travel of the finger stop, is twice the angular pitch of the finger holes.

A pin 184 mounted on the off-normal contact operator 151 engages a movable contact spring 185 carrying an off-normal contact 185A, the spring being greater in length than and biased toward a fixed contact spring 186 carrying an off-normal contact 186A. The contact springs are interleaved with a dielectric spacer 187 and fastened to a raised arm portion of the mounting block 170 by screws 188 around which are placed dielectric sleeves 189. The mounting block is itself secured to the frame 131 by fasteners such as 190.

In the operation of this second embodiment the user inserts his finger in the finger hole 111 corresponding to the particular digit he wishes to transmit and moves his finger through an arcuate path so as to rotate the finger wheel 110 in the direction indicated by the arrow WU. Because the finger wheel is fixedly coupled to the main gear 149 and secured to one end of the motor spring 140, the rotation of the finger wheel rotates the main gear and winds up the motor spring. The off-normal contact operator 151 is frictionally coupled to the main gear, and the finger stop 120 is fixedly coupled to the operator, and therefore the operator and finger stop move with the main gear.

The initial movement of the finger wheel 110 and thereby the main gear 149 moves the pin 184 mounted on the off-normal contact operator 151 from the movable contact spring 185 and permits the movable spring to engage the fixed contact spring 186 and close the off-normal contacts 185A and 186A. Further movement of the main gear brings the operator into engagement with the arm 181 of the bearing plate 178 at which time the motion of the operator and thereby the finger stop is arrested. The movement of the finger wheel is continued until the user's finger strikes the arm portion 122 of the finger stop. If the finger wheel is rotated beyond this point, the pin 126 attached to the top surface of the finger wheel cap 115 eventually engages the stop 124 mounted in the circular groove 123 in which the pin 126 rides, and the finger wheel is prevented from rotating further.

When the user's finger is removed from the finger hole 111 in the finger wheel 110, and the finger wheel is allowed to run down, the wheel and thereby the main gear 149 rotate in the direction indicated by the arrow RD. The off-normal contact operator 151 and thereby the finger stop 120 move with the main gear until the pin 184 mounted on the operator engages the movable contact spring 185. The friction between the operator and the main gear is selected so as to be insufficient to overcome the spring force of the movable contact spring, and the motion of the operator is arrested a small distance from the arm 182 of the plate 178. Immediately before the finger wheel reaches the rest position, the pin 126 attached to the finger wheel 115 strikes the stop 124 in the groove 123 of the finger stop 120 and moves the finger stop and thereby the operator through the small distance necessary for the operator to engage the arm 182. This moves the operator just enough for the pin 184 to separate the movable contact spring 185 from the fixed contact spring 186 and thereby opens the off-normal contacts 185A and 186A. The arm 182 arrests the movement of the operator and finger stop, and the stop 124 in the finger stop arrests the movement of the finger wheel.

The operation of the other components of the dial are essentially the same as in the first embodiment.

The phrase "fixedly coupled" as used in the above description and in the appended claims refers to a relationship between two members wherein when there is movement of one member, there must be movement of the other member, and when one member is prevented from moving, the other member cannot move either. Under this definition two members affixed to a common shaft would be said to be fixedly coupled one to the other.

The phrase "frictionally coupled" refers to a relationship between two members wherein when there is movement of one member, the other member tends to move therewith and will move unless its movement is restrained in some way. But if one member is prevented from moving, this does not by itself stop the other member from moving. Under this definition, the face plates of a slip clutch would be said to be frictionally coupled one to the other.

The phrase "loosely coupled" refers to a relationship between two members that are in contact with each other or in contact with members fixedly coupled to the other wherein when one member is moved, there is little or no tendency for the other member to move. An example of such a relationship would be one member freely pivoted directly on the other member or on a member fixedly coupled to the other member.

The phrase "displaceably coupled" is generic to both frictionally coupled and loosely coupled members.

Although but two embodiments of the invention have been illustrated and described in detail, it is to be expressly understood that the invention is not limited thereto. Various changes can be made in the design and arrangement of the parts without departing from the spirit and the scope of the accompanying claims.

What is claimed is:

1. A telephone dial comprising a finger wheel having a plurality of finger holes therein by means of which it may be rotated from a rest position through arcs of various lengths, rotary shaft means driven by the wheel, an operator displaceably coupled to the shaft means, a plurality of juxtaposed contact carrying springs, one of which is positioned in the path of travel of the operator and is displaced by the operator only when the finger wheel is in the rest position, the contact spring being biased to displace the operator in a first direction of rotation, and means fixedly coupled to the shaft means for positively displacing the operator in a counterdirection of rotation when the finger wheel returns to the rest position.

2. A telephone dial as in claim 1 in which the finger holes are spaced around the entire periphery of the finger wheel and the distance between adjacent holes is approximately equal.

3. A telephone dial as in claim 2 including a finger stop for limiting the rotation of the finger wheel from the rest position, the finger stop being frictionally coupled to the finger wheel and movable therewith through a predetermined distance.

4. A telephone dial as in claim 3 including means in which power is stored when the finger wheel is rotated from the rest position for returning the finger wheel to the rest position, the finger stop and the finger wheel having cooperating detent means for stopping the finger wheel when it returns to the rest position.

5. A telephone dial as in claim 4 in which the operator is frictionally coupled to the shaft means.

6. A telephone dial as in claim 4 in which the operator is loosely coupled to the shaft means.

7. A telephone dial as in claim 4 in which the positive displacing means comprises an actuating member secured to the shaft means so as to rotate therewith, the actuating member having a pin mounted therein so as to engage the operator but not to engage the juxtaposed contact springs.

8. A telephone dial comprising a finger wheel having a plurality of finger holes therein by means of which it may be rotated from a rest position through arcs of various lengths, rotary shaft means driven by the wheel, an actuating member mounted on the shaft means so as to rotate therewith, an operator frictionally coupled to the actuating member and movable therewith through a predetermined distance, juxtaposed contact carrying springs positioned so that movement of the operator effects the opening or closing of the contacts on the springs, a finger stop overlying the finger wheel and fixedly coupled to the operator, and means for positively displacing the finger stop when the wheel returns to the rest position.

9. A telephone dial as in claim 8 in which the finger stop includes a detent depending therefrom and the positive displacing means comprises a pin mounted on the finger wheel so as to engage the detent when the wheel returns to the rest position.

References Cited in the file of this patent

UNITED STATES PATENTS

| | | |
|---|---|---|
| 1,286,982 | Forsberg | Dec. 10, 1918 |
| 1,556,905 | Blessing | Oct. 13, 1925 |
| 2,320,401 | Beizer et al. | June 1, 1943 |
| 2,479,088 | Stull | Aug. 16, 1949 |
| 2,905,766 | Soderbaum | Sept. 22, 1959 |
| 2,963,554 | Hershey | Dec. 6, 1960 |

Disclaimer 3,108,159.—*Charles F. Mattke*, Fanwood, N.J. SPACE SAVER DIAL. Patent dated Oct. 22, 1963. Disclaimer filed Feb. 11, 1972, by the assignee, *Bell Telephone Laboratories, Incorporated.*

Hereby enters this disclaimer to claims 1 through 7 of said patent.

[*Official Gazette July 25, 1972.*]